United States Patent
Ban

(10) Patent No.: US 7,864,713 B2
(45) Date of Patent: Jan. 4, 2011

(54) METHOD AND APPARATUS FOR SELF-CONFIGURING ROUTING DEVICES IN A NETWORK

(75) Inventor: Oliver Keren Ban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/144,436

(22) Filed: Jun. 23, 2008

(65) Prior Publication Data

US 2008/0247333 A1   Oct. 9, 2008

Related U.S. Application Data

(63) Continuation of application No. 10/880,721, filed on Jun. 30, 2004, now Pat. No. 7,474,632.

(51) Int. Cl.
*H04L 12/28* (2006.01)

(52) U.S. Cl. .................. 370/256; 370/351; 370/408

(58) Field of Classification Search .................. 370/254, 370/256
See application file for complete search history.

(56) References Cited

U.S. PATENT DOCUMENTS

| | | | |
|---|---|---|---|
| 5,226,040 A * | 7/1993 | Noble et al. ................. 370/257 |
| 6,757,263 B1 | 6/2004 | Olds | |
| 6,791,939 B1 | 9/2004 | Steele, Jr. et al. | |
| 6,795,403 B1 | 9/2004 | Gundavelli | |
| 2002/0083254 A1 | 6/2002 | Hummel et al. | |
| 2002/0085552 A1* | 7/2002 | Tandon ....................... 370/389 |
| 2003/0043820 A1 | 3/2003 | Goringe et al. | |
| 2003/0095504 A1* | 5/2003 | Ogier ......................... 370/235 |
| 2003/0179742 A1* | 9/2003 | Ogier et al. ................. 370/351 |
| 2003/0225893 A1 | 12/2003 | Roese et al. | |
| 2004/0003111 A1* | 1/2004 | Maeda et al. ............... 709/237 |
| 2004/0019876 A1* | 1/2004 | Dravida et al. ............. 717/117 |
| 2004/0081152 A1 | 4/2004 | Thubert et al. | |
| 2004/0111623 A1 | 6/2004 | Miller et al. | |
| 2004/0136357 A1 | 7/2004 | Jo et al. | |
| 2005/0079874 A1 | 4/2005 | Benco et al. | |
| 2005/0195835 A1 | 9/2005 | Savage et al. | |
| 2005/0201300 A1 | 9/2005 | Bridgelall | |

* cited by examiner

*Primary Examiner*—Huy D Vu
*Assistant Examiner*—Brandon Renner
(74) *Attorney, Agent, or Firm*—Yee & Associates, P.C.; Steven L. Bennett

(57) ABSTRACT

A method, apparatus, and computer instructions for configuring routing devices in a network data processing system. A routing change is identified in the network data processing system. In response to the routing change being identified, a node topology is generated for a set of routing devices present in the network data processing system. A master network configuration table is built at a routing device within the set of routing devices. The network configuration table contains configuration data from the routing devices in the node topology. The master network configuration table is broadcast to the routing devices in the network data processing system.

15 Claims, 4 Drawing Sheets

FIG. 6
| 602 SYMBOL | ROUTING TREE TABLE 604 SPEED CODE | 606 STATUS CODE |
|---|---|---|
| 0FFF01 | 214312 | CODE (1, 5) |
| 0FFF02 | * | |
| ⋮ | ⋮ | ⋮ |
| 0FFFFF | | |
600
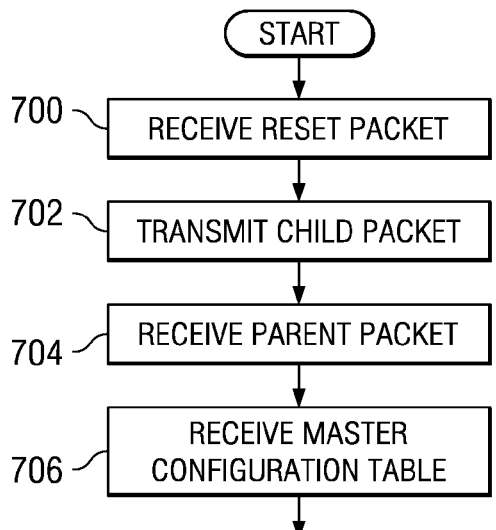
FIG. 7
- 700 RECEIVE RESET PACKET
- 702 TRANSMIT CHILD PACKET
- 704 RECEIVE PARENT PACKET
- 706 RECEIVE MASTER CONFIGURATION TABLE
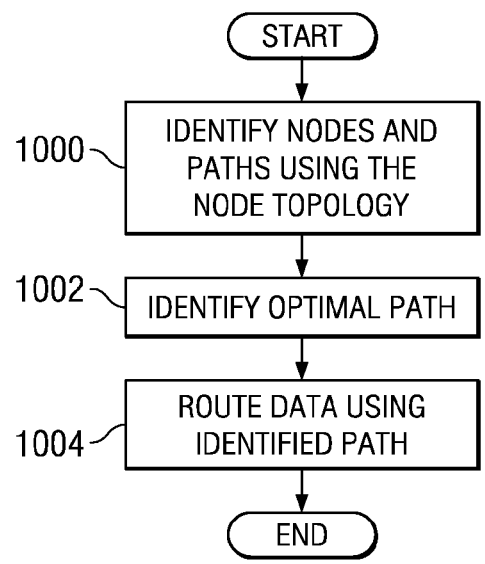
FIG. 10
- 1000 IDENTIFY NODES AND PATHS USING THE NODE TOPOLOGY
- 1002 IDENTIFY OPTIMAL PATH
- 1004 ROUTE DATA USING IDENTIFIED PATH

METHOD AND APPARATUS FOR SELF-CONFIGURING ROUTING DEVICES IN A NETWORK

This application is a continuation application of U.S. Ser. No. 10/880,721, filed Jun. 30, 2004, and entitled, "Method and Apparatus for Self-Configuring Routing Devices in a Network."

BACKGROUND OF THE INVENTION

1. Technical Field

The present invention relates generally to an improved data processing system and in particular, a method and apparatus for processing changes in a network. Still more particularly, the present invention provides a method, apparatus, and computer instructions for reconfiguring routing devices.

2. Description of Related Art

Routing devices, such as switches and routers are used to facilitate the transfer of data between different computers in the network. Routing of data occurs seamlessly to the computers, except for in a few situations. The addition of new hardware, or the failure of existing hardware for routing traffic may disrupt or cause the delivery of data to fail.

When new hardware, such as a new router is added, routing problems occur unless the other routing devices are stopped and reconfigured to take into account or include the new router. If an existing router fails or is taken out of service, the entire network may shut down because of errors occurring with the absence of the existing router. Alternatively, other routing devices may not know that the existing router has failed and may continue to send data packets to that router. In this situation, those packets are lost and never reach their destination. Currently, this situation requires an administrator or other personnel to replace or fix the failed router or reconfigure the other routing devices to stop routing traffic through the existing router that has failed.

Therefore, it would be advantageous to have an improved method, apparatus, and computer instructions for taking into account routing hardware changes in a network.

SUMMARY OF THE INVENTION

The present invention provides a method, apparatus, and computer instructions for configuring routing devices in a network data processing system. A routing change is identified in the network data processing system. In response to the routing change being identified, a node topology is generated for a set of routing devices present in the network data processing system. A master network configuration table is built at a routing device within the set of routing devices. The network configuration table contains configuration data from the routing devices in the node topology. The master network configuration table is broadcast to the routing devices in the network data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an example of a node topology in accordance with a preferred embodiment of the present invention;

FIG. 7 is a flowchart of a process for responding to a reset packet in accordance with a preferred embodiment of the present invention;

FIG. 10 is a flowchart of a process for routing data in accordance with a preferred embodiment of the present invention.

DETAILED DESCRIPTION OF THE PREFERRED EMBODIMENT

Figure 1:
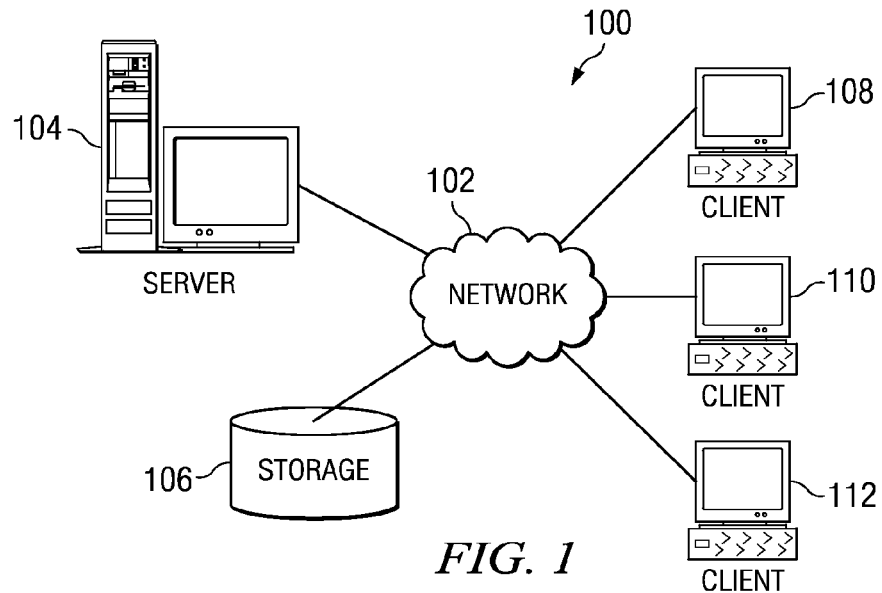
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. For example, network data processing system 100 includes routing devices, such as routers and switches. These routing devices are used to facilitate the transfer of data between different data processing systems within network data processing system 100.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
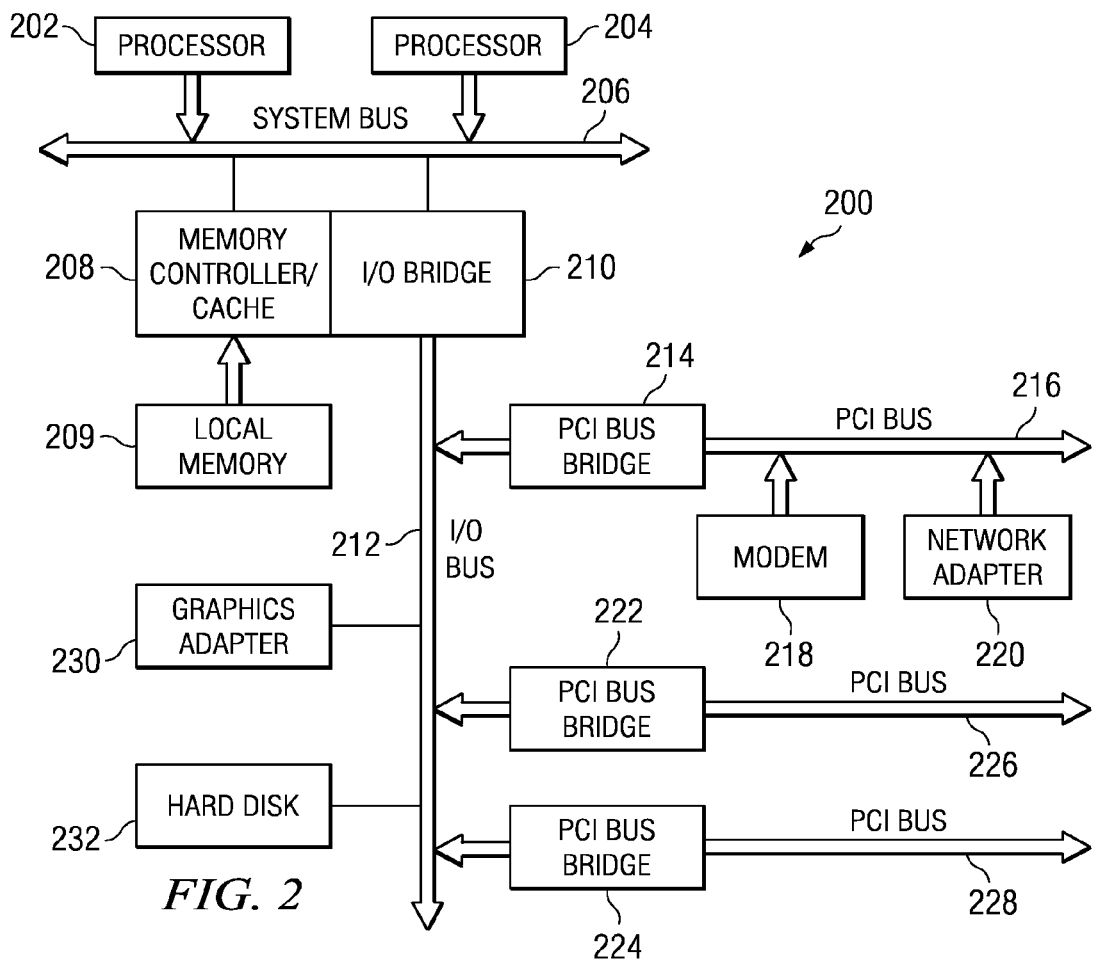
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
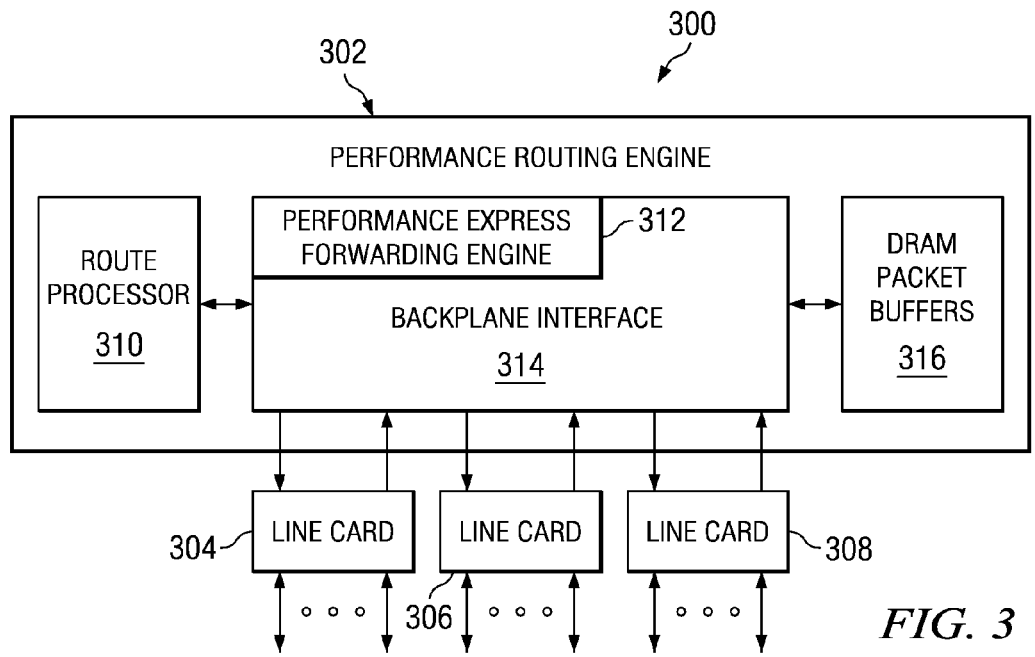
FIG. 3 is a block diagram of a routing device in accordance with a preferred embodiment of the present invention.

With reference next to FIG. 3, a block diagram of a routing device is depicted in accordance with a preferred embodiment of the present invention. In this example, the routing device takes the form of router 300. This router may be implemented to route traffic in a network such as network 102 in FIG. 1. A router is a device that forwards data packets from one local area network (LAN) or wide area network (WAN) to another. Based on routing tables and routing protocols, routers read the network address in each transmitted frame and decide how to send the frame based on the most expedient route. Routers work at layer 3 in the protocol stack.

Router 300 includes performance routing engine 302 and line cards 304, 306, and 308. Performance routing engine 302 contains route processor 310, performance express forwarding engine 312, backplane interface 314, and dynamic random access memory (DRAM) packet buffers 316.

Route processor 310 provides packet manipulations for layer 2 and layer 3 when routing data packets. Performance express forwarding engine 312 performs the routing of data packets received and stored in DRAM packet buffers 316. Line cards 304, 306, and 308 each manages its own particular type of interface with respect to sending and receiving complete data packets to performance routing engine 302 across backplane interface 314, which provides an interface to connect these line cards. Router 300 contains redundant routing engines, such as performance routing engine 302 in the illustrative examples.

Figure 4:
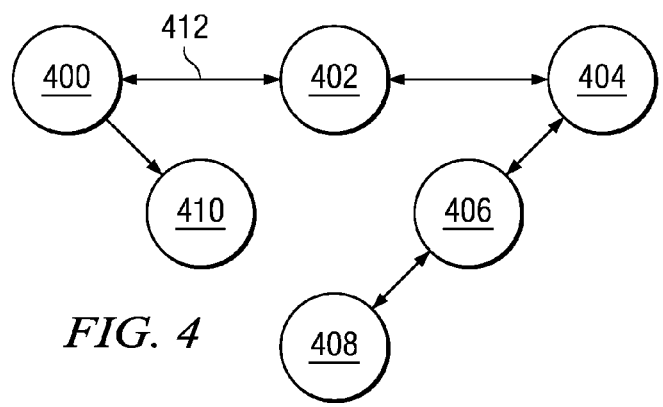
FIG. 4 is a diagram of routing devices in which the present invention may be implemented.

Turning now to FIG. 4, a diagram of routing devices in which the present invention may be implemented is illustrated. Nodes 400, 402, 404, 406, 408, and 410 represent routing devices such as routers. These nodes may be implemented using a router, such as router 300 in FIG. 3.

In this example, configuration problems may occur in path 412 between node 400 and node 402. A failure in node 402 may cause the problem in the path. Those routers on path 412 need to be aware of this change and promptly respond to the failure without disturbing other pathways. With this problem, the overall performance is limited by path 412 between node 400 and node 402 between the originator, such as node 400, to the final destination in node 406. The packet source or sender may still send packets in the original speed setting and receive packets that are bounced back. Otherwise, the packets may simply disappear without reaching node 406.

The present invention provides a method, apparatus, and computer instructions for identifying changes in the nodes in FIG. 4. The changes include, for example, a failure of a node, a removal of a node, or an addition of a new node. These changes may be identified using existing mechanisms, such as detecting packet loss, detecting corrupt routing tables, or other errors. The changes may be identified by the node in which the error occurs in or in other cases by other nodes.

When changes occur, the node topology is identified for the nodes that are present in the system. The nodes will send messages indicating their presence in the system. This node topology includes an identification of the nodes that are present. The mechanism of the present invention selects one of the nodes to act as master or parent node. This node may be preselected or based on some scheme. For example, the master node may be the node that is last to respond to a change in the nodes. A master configuration table is created. This table includes configuration information from all of the nodes. A configuration table is a collection of information used by a router to determine where a data packet should go or be routed. Information in a configuration table includes information on which connections lead to particular groups of addresses, priorities for connections to be used, and rules for handling both routine and special cases of traffic. The table and the node topology are then sent to all of the nodes.

The mechanism of the present invention allows for more efficient routing and responses to changes in routing devices in a network. This mechanism may be implemented as part of a set up process for routing devices and reduces bottlenecks and degradation in network performance.

In this illustrative example in FIG. 4, if a change such as a change in a routing table or a new node is added to the nodes depicted in this figure, the changed node or the new node sends packets specially coded in the header to indicate that a reset mode will be entered. If a failure occurs in a node, this failed node may be detected by another node, which initiates the reset mode in this example.

In this mode, each node first sends out communication packets with special pre-defined header. Whenever a new node is introduced into the network or a change occurs inside any of the existing nodes a reset mode is initiated. Inside the communication packets, the message includes an "I am your child" code that each node sends out to the nearby nodes.

Then the receiving node sends back a "o.k. I am your parent" code message to the sending child node. This sequence is repeated until the maximum number of nodes are reached. The number may be any number. In this illustrative example, the maximum number of nodes is 16. The node sending the parent code messages to the child nodes may be, for example, some preselected node in the system. A topology, such as a single rooted tree structure, is established inside the network. In this example, the node that waited the longest becomes the root to the tree structure.

Topologically, any node can be the root node or the governing node. The only purpose of the root node is to maintain the master connecting configuration tables that will be sent out by each child node. Many parent nodes may be present in a network, while only one root node is defined for the network topology. Parent nodes may have different levels in which a lower level parent node is a child node of a higher level parent node.

Once the root tree structure is established, then the root node assigns a node ID number to each child node. Additionally, the root node obtains configuration data, such as configuration tables, from each child node. These configuration tables are used to build a master configuration table. When this master configuration table is completed, the root node broadcasts this configuration table to every child node so every node in the local tree system has a clear idea of the capability of each node inside the system.

By applying this process to nodes, such as those illustrated in FIG. 4, the efficiency of the transmission is increased. Thus, the network bottleneck problems are significantly decreased. Any future changes of the existing system due to capability or new added capacity will cause a new reset such that an updated configuration table is generated and broadcast.

Figure 5:
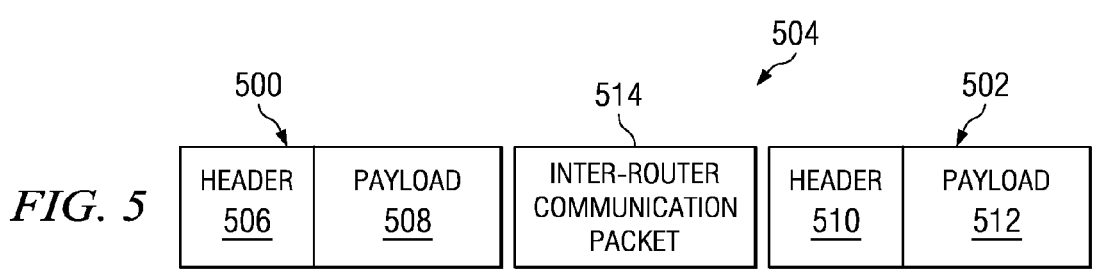
FIG. 5 is a diagram illustrating a packet sequence in accordance with a preferred embodiment of the present invention.

Turning now to FIG. 5, a diagram illustrating a packet sequence is depicted in accordance with a preferred embodiment of the present invention. Packets 500 and 502 are examples of data packets in packet sequence 504 that are normally handled by nodes, such as those illustrated in FIG. 2. Packet 500 contains header 506 and payload 508. Similarly, data packet 502 contains header 510 and payload 512.

The mechanism of the present invention provides a mechanism for reporting changes and sending communications to different nodes. This mechanism involves adding a new type of packet to the normal packet sequence, such as inter-router communication packet 514. Inter-router communication packet 514 contains a predefined header containing an indicator, such as a code or flag that is recognized by other routers as being packets containing information for use by routers. Inter-router communication packet 514 is sent along with data packets in these illustrative examples. These types of communication packets are interspersed between data packets within packet sequence 504.

With reference next to FIG. 6, an example of a node topology is depicted in accordance with a preferred embodiment of the present invention. Node topology 600 takes the form of a table in this illustrative example. Specifically, node topology 600 is a routing lookup table code book that represents a routing tree map. This table contains symbol 602, speed code 604 and status code 606. Symbol 602 represents an identifier for a node in this example. Speed code 604 identifies or indicates the routing speed of the node. Status code 606 provides status information regarding the node. Of course, other information may be included in routing tree table 600 in place of or in addition to the information and characteristics about the nodes.

With reference now to FIG. 7, a flowchart of a process for responding to a reset packet is depicted in accordance with a preferred embodiment of the present invention. The process illustrated in FIG. 7 may be implemented in a node, such as node 400 in FIG. 4.

The process begins by receiving a reset packet (step 700). This packet is an inter-router communication packet, such as inter-router communication packet 514 in FIG. 5. This type of packet is identified through a code or flag placed in the header of the packet in these illustrative examples. The receipt of this reset packet places the node in a reset mode as described above. Next, a child packet is transmitted (step 702). Then, a parent packet is received (step 704). Thereafter, a master configuration table and a network topology is received (step 706) with the process terminating thereafter.

At this point, the router may route data using the master configuration table and the network topology. The network topology may be used by application layer processes to identify paths for routing data. The actual routing of data is performed using the master configuration table.

Figure 8:
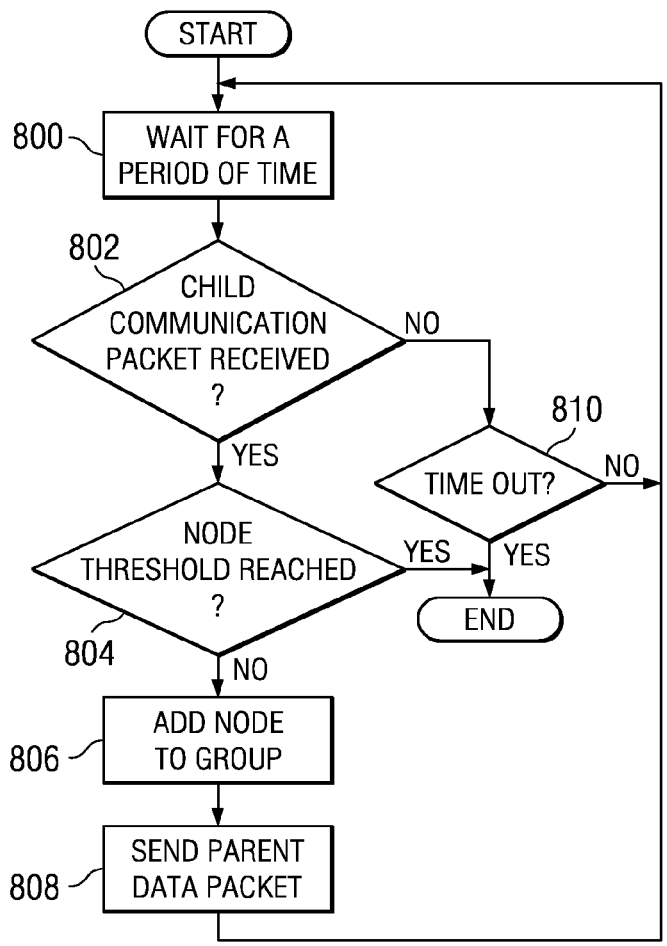
FIG. 8 is a flowchart of a process for receiving child communication packets in accordance with a preferred embodiment of the present invention.

With reference now to FIG. 8, a flowchart of a process for receiving child communication packets is depicted in accordance with a preferred embodiment of the present invention. The process illustrated in FIG. 8 may be implemented in a node, such as node 400 in FIG. 4.

The process begins by waiting for a period of time (step 800). Next, a determination is made as to whether a child packet is received (step 802). The child packet in step 802 is an inter-router communication packet that contains a code indicating that the packet is received from a child node. Although not shown, other information or codes may be present in the packet to provide other information, such as, for example, handshake signals. If a child packet is received, then a determination is made as to whether the node threshold is reached (step 804). If the node threshold is not reached, then a node is added to the group (step 806). This threshold may be set based on the number of nodes that may be optimally grouped. For example, the threshold may be 16 nodes. Next, a parent packet is sent (step 808) with the process then returning to step 800 as described above. The parent packet is an inter-router communication packet that serves as an acknowledgement to the child node sending the child packet, indicating that the child packet has been received from the child node.

Referring back to step 802, if a child packet is not received, then a determination is made as to whether a time out has occurred (step 810). If a time out is needed, then the process returns to step 800 as described above. If a time out has occurred, then the process terminates.

Figure 9:
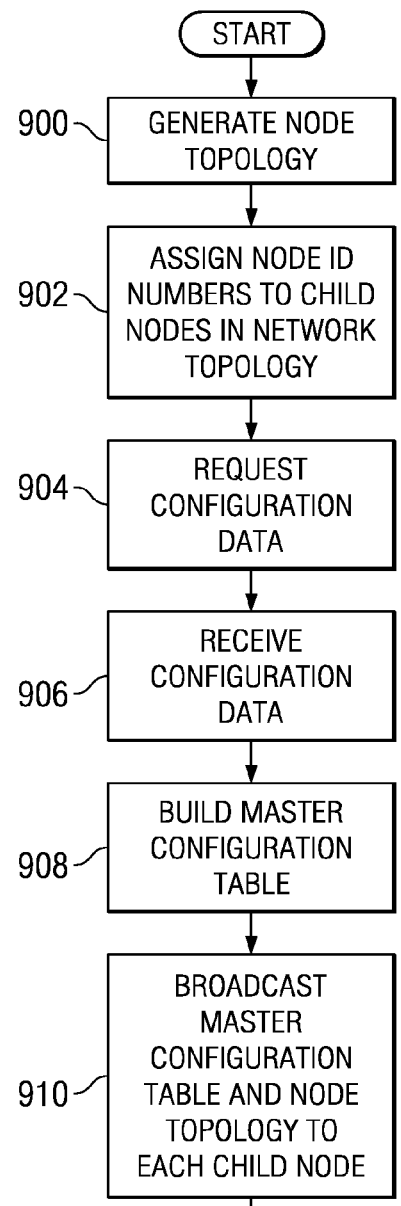
FIG. 9 is a flowchart of a process for creating configuration data for nodes in accordance with a preferred embodiment of the present invention.

With reference now to FIG. 9, a flowchart of a process for creating configuration data for nodes is depicted in accordance with a preferred embodiment of the present invention. The process illustrated in FIG. 9 may be implemented in a node, such as node 400 in FIG. 4.

The process begins by generating node topology (step 900). Next, node ID numbers are assigned to the child nodes (step 902). Node ID numbers are used to tag the node. Next, configuration data is requested (step 904). This configuration data includes configuration tables.

Then, configuration data is received (step 906). In response to receiving this configuration data, a master configuration table is built (step 908). Then, this configuration table and the node topology are broadcast for receipt by each child node (step 910) with the process terminating thereafter.

With reference now to FIG. 10, a flowchart of a process for routing data is depicted in accordance with a preferred embodiment of the present invention. The process illustrated in FIG. 10 may be implemented a node, such as node 400 in FIG. 4. Specifically, this process is implemented in an application layer in the node in these examples.

The process begins by identifying nodes and paths using the node topology (step 1000). Next, the optimal path is identified (step 1002). The optimal path may be selected in many different ways. For example, the optimal path may select a path based on identifying a path containing the fastest routers. Alternatively, the shortest path may be selected by identifying the path using the least amount of routers. Then data is routed using the identified path (step 1004) with the process terminating thereafter.

Thus, the present invention provides a method, apparatus, and computer instructions for managing configuration information in routing devices to respond to changes in the routing devices. The mechanism of the present invention utilizes an inter-router communication protocol and the establishment of a root router, the "self governing console" body in the local network environment. A root router first sends out inter-router communication packets with a special pre-defined header, whenever a new node is introduced into the network or a change occurs inside any of the existing nodes.

Inside these inter-router communication packets, a message contains a "I am your child" code that each node sends out to the nearby nodes. Then, the node receiving this message returns a message with a "o.k. I am your parent" code message to the sending node. This sequence is repeated until the maximum number of nodes is reached. With this information from the nodes responding to the initial message, a single rooted tree structure is established inside the network. In the illustrative examples, the node which waited the longest becomes the root. Topologically, any node can be the root node or the governing node. The only purpose of the root node is to maintain the master configuration tables sent by each child node.

Once the root tree structure is established, the root node assigns a node ID number to each child node. This root node also obtains configuration data from each child node. Once the root node builds or creates a master configuration table, the root node broadcasts the master configuration table to every child node. In this manner, every node in the local tree system has a clear idea of the capability of each node inside the system. Additionally, the topology of nodes also is sent to the other nodes for use in routing data packets. Thus, with the master configuration table and the topology of the nodes, the network bottleneck problems may be significantly reduced. Any future changes of the existing system due to capability or newly added capacity will cause a new reset so that a new updated table may be generated and broadcast.

Additionally, the tree structure and communication protocol can be implemented as pure software function blocks without any added hardware capability as it is totally utilized by the existing hardware facilities.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for configuring routing devices in a network data processing system, the data processing system comprising:
    a memory having instructions encoded thereon;
    a bus connecting the memory to a processor; and
    a processor, wherein the processor executes the instructions: to identify a routing change in the network data processing system;
    responsive to identifying the routing change, to generate a node topology for a set of routing devices present in the network data processing system, wherein generating the node topology includes receiving a child message from a particular routing device in the routing devices, responsive to receiving the child message, returning a parent message to the particular routing device, and responsive to receiving the child message from the routing device, adding the particular routing device to the node topology, wherein child messages are sent in response to the routing devices receiving a reset message; to build a master network configuration table at a routing device within the set of routing devices, wherein the network configuration table contains configuration data from the routing devices in the node topology; and to broadcast the master network configuration table to the routing devices in the network data processing system.

2. The data processing system of claim 1, wherein the node topology is a tree structure.

3. The data processing system of claim 1, wherein the routing change is an addition of a new routing device to the set of routing devices in the network data processing system.

4. The data processing system of claim 1, wherein the routing change is a configuration change in a selected routing device in the network data processing system.

5. The data processing system of claim 1, wherein the routing device is one of a router, a domain name system server, or a switch.

6. The data processing system of claim 1, wherein a root node is a last routing device to send the child message.

7. A recordable-type medium containing instructions for automatically configuring routing devices in a network data processing system, the instructions comprising:
    first instructions for identifying a routing change in the network data processing system;
    second instructions, responsive to identifying the routing change, for generating a node topology for a set of routing devices present in the network data processing system, wherein the second instructions include first sub-instructions for receiving a child message from a particular routing device in the routing devices, second sub-instructions, responsive to receiving the child message, for returning a parent message to the particular routing device, and third sub-instructions, responsive to receiving the child message from the routing device, for adding the particular routing device to the node topology, wherein child messages are sent in response to the routing devices receiving a reset message;

third instructions for building a master network configuration table at a routing device within the set of routing devices, wherein the network configuration table contains configuration data from the routing devices in the node topology; and fourth instructions for broadcasting the master network configuration table to the routing devices in the network data processing system.

8. The recordable-type medium of claim 7, wherein the node topology is a tree structure.

9. The recordable-type medium of claim 7, wherein the routing change is an addition of a new routing device to the set of routing devices in the network data processing system.

10. The recordable-type medium of claim 7, wherein the routing change is a configuration change in a selected routing device in the network data processing system.

11. The recordable-type medium of claim 7, wherein the routing device is one of a router, a domain name system server, or a switch.

12. The recordable-type medium of claim 7, wherein a root node is a last routing device to send the child message.

13. The recordable-type medium of claim 7, wherein the reset message is sent from a new routing device in the routing devices.

14. The recordable-type medium of claim 7, wherein the child message and the parent message are sent using inter-router communications.

15. The recordable-type medium of claim 7, wherein the set of routing devices is a portion of the routing devices in the network data processing system.

* * * * *